US011143615B2

(12) United States Patent
Pierre et al.

(10) Patent No.: US 11,143,615 B2
(45) Date of Patent: Oct. 12, 2021

(54) PRINTED HYGROSCOPIC ELECTRODES FOR LOW-COST CAPACITIVE RELATIVE HUMIDITY SENSORS

(71) Applicant: Palo Alto Research Center Incorporated, Palo Alto, CA (US)

(72) Inventors: Adrien Pierre, South San Francisco, CA (US); Sean Emerson Doris, San Francisco, CA (US); David Eric Schwartz, Concord, MA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 210 days.

(21) Appl. No.: 16/176,067

(22) Filed: Oct. 31, 2018

(65) Prior Publication Data
US 2020/0132616 A1  Apr. 30, 2020

(51) Int. Cl.
*G01N 27/22* (2006.01)
*G01N 27/60* (2006.01)

(52) U.S. Cl.
CPC ......... *G01N 27/225* (2013.01); *G01N 27/605* (2013.01)

(58) Field of Classification Search
CPC ..................... G01N 27/225; G01N 27/605
See application file for complete search history.

(56) References Cited

U.S. PATENT DOCUMENTS

2015/0153297 A1* 6/2015 Aliane ............... G01N 27/223
73/335.04

FOREIGN PATENT DOCUMENTS

| GB | 1570054 A | * | 6/1980 | ........ G01N 27/225 |
| WO | WO-0175429 A1 | * | 10/2001 | ........ G01N 27/225 |
| WO | WO-2006097566 A1 | * | 9/2006 | ........ G01N 27/414 |
| WO | WO-2010006877 A1 | * | 1/2010 | ........ G01N 27/225 |
| WO | WO-2018153885 A1 | * | 8/2018 | ........ G01N 27/225 |

OTHER PUBLICATIONS

Starke, E., Türke, A., Krause, M. & Fischer, W.-J. Flexible polymer humidity sensor fabricated by inkjet printing. in *Solid-State Sensors, Actuators and Microsystems Conference (Transducers)*, 2011 16th International 1152-1155 (2011).
Molina-Lopez, F., Briand, D. & De Rooij, N. F. All additive inkjet printed humidity sensors on plastic substrate. *Sensors Actuators B Chem.* 166, 212-222 (2012).
Molina-Lopez, F., Quintero, A. Vásquez, Mattana, G., Briand D and de Rooij, N.F, Large-area compatible fabrication and encapsulation of inkject-printed humidigy sensors on flexible foils with integrated thermal compensation. *J. Micromechanics and Microengineering*, V 23, N. 2. (2013).

(Continued)

*Primary Examiner* — Ryan D Walsh
(74) *Attorney, Agent, or Firm* — Fay Sharpe LLP (57) ABSTRACT

A capacitive relative humidity sensor includes a first electrode and a second electrode, where at least the one of the electrodes is a water-permeable electrode. The electrodes act in conjunction with a water-sensitive hygroscopic dielectric material. The design enables low-cost and simple fabrication of fast-responding and stable relative humidity sensors using digital fabrication techniques.

19 Claims, 5 Drawing Sheets

(56) References Cited

OTHER PUBLICATIONS

Dokmeci, M. & Najafi, K. A high-sensitivity polyimide capacitive relative humidity sensor for monitoring anodically bonded hermetic micropackages. *J. Microelectromechanical Syst.* 10, 197-204 (2001).
Kim, J.-H., Hong, S.-M., Lee, J.-S., Moon, B.-M. & Kim, K. High sensitivity capacitive humidity sensor with a novel polyimide design fabricated by MEMS technology. in *Nano/Micro Engineered and Molecular Systems, 2009. NEMS 2009. 4th IEEE International Conference on* 703-706 (2009).

\* cited by examiner

PRINTED HYGROSCOPIC ELECTRODES FOR LOW-COST CAPACITIVE RELATIVE HUMIDITY SENSORS

STATEMENT REGARDING FEDERALLY SPONSORED RESEARCH AND DEVELOPMENT

This invention was made with government support under contract NL0032095 awarded by the Department of Energy, and through contract 4000152637 awarded by Oak Ridge National Laboratory. The government has certain rights in this invention.

BACKGROUND

Existing commercial relative humidity (RH) sensors are commonly configured as packaged electronic modules having an accuracy of ±3%. Individually, the packaged modules cost several dollars or more, incorporate a printed circuit board for mounting, and are not planar or flexible. Low-cost alternatives of these modules include interdigitated electrode capacitor type designs and porous parallel-plate electrode arrangements. Such existing devices are manufactured with lithographically patterned or screen printed top electrodes, among other complex manufacturing processes. The present disclosure teaches improved manufacturing processes and device designs that result in cost effective and highly accurate, responsive, planar, and flexible RH sensors.

BRIEF DESCRIPTION

The capacitive relative humidity (RH) sensor includes a first electrode and a second electrode, where at least one of the electrodes is a water-permeable or water vapor-permeable electrode. The electrodes act in conjunction with a water-sensitive hygroscopic dielectric material. The design enables low-cost and simple fabrication of fast-responding and stable relative humidity sensors using printing fabrication techniques.

DETAILED DESCRIPTION

Relative humidity (RH) sensors designed in a capacitive (e.g., parallel plate) type arrangement, such as discussed in association with the present disclosure, include a water absorptive dielectric material capable of absorbing fluid such as water from the air (e.g., in the form of moisture, vapor, etc.). One example of such a water absorptive dielectric is polyimide, although other water adsorptive dielectrics are available. The dielectric constant and/or geometry of such water absorptive dielectric material is a function of humidity (i.e., the amount of water the dielectric takes-up is a function of humidity, and so changes with humidity). Therefore, when designing RH sensors in a capacitor type design, this form of water absorptive dielectric will cause the capacitance of the RH sensor to be a function of humidity. To further explain, it is noted that one mechanism for the capacitance to be a function of humidity is that a geometric parameter (e.g., thickness) of the water absorptive dielectric layer changes with humidity, causing changes in capacitance between a first electrode and a second electrode. Another mechanism is that the relative permittivity of the dielectric changes with absorption of water.

A useable relative humidity (RH) sensor in a capacitor (e.g., parallel plate) design needs to be designed to allow the water (e.g., moisture or vapor) to reach the water absorptive dielectric in an appropriate amount of time. For example, if the electrodes in the capacitive structure of a relative humidity (RH) sensor were constructed as solid metal electrodes on both sides of the dielectric, water would need to diffuse to the water absorptive dielectric from the sides of the electrodes. Such a configuration would result in too long of a period for the absorption by the dielectric, resulting in an undesirable response time for the RH sensor.

A proposed solution in the art to this response time issue is to use an inter-digitated electrode geometry instead of a plate geometry on at least one side of a water absorptive dielectric of a relative humidity (RH) sensor structure. This allows the water (moisture, vapor) to reach the water absorptive dielectric through open portions of the inter-digitated design. It is also understood that employing this design with low-cost manufacturing techniques (e.g., inkjet printing, aerosol printing, screen printing, etc.) yields sensors with lower capacitance and sensitivity for a given footprint. Having a lower capacitance is disadvantageous as it reduces the ability to discriminate the sensor signal from parasitic capacitance in the system. Higher capacitances and sensitivities can be obtained by manufacturing interdigitated electrodes with smaller feature sizes using techniques like photolithography, although this dramatically increases the manufacturing cost.

Another potential structure that has been discussed is the use of an electrode which employs a carbon black material. It is intended that the specific carbon black material have sufficient porosity to allow the water to move through the electrode (i.e., made of the carbon black) to the water absorptive dielectric. An issue with using carbon black is that the processes to manufacture such carbon black electrodes require operations such as screen printing or lithographic patterning that are not compatible with digital design and fabrication, as the particulate nature of carbon black makes effective inkjet and/or aerosol printing challenging. Furthermore, the conductivity of carbon black is several orders of magnitude lower than metallic electrodes. This dramatically increases the RC time-constant of the sensor and limits the sensor response time and range of measurement frequencies that can be employed.

Another existing alternative is manufacturing a top electrode as a grid of silver lines, where the water diffuses to the water absorptive dielectric through the open areas in the grid. However, an issue with this design is there will be less capacitance due to the open areas within the grid. Additionally, as noted above, having a lower capacitance makes distinguishing the sensor signal from parasitic capacitance in the system more challenging, which increases the complexity and cost of the sensor read-out electronics.

The present disclosure offers an alternative to the costly, difficult to manufacture, and bulky state-of-the-art RH sensors described above. Removing the need to perform lithographic patterning, screen printing, and other non-digital processes makes the present design and processes an attractive alternative to sensors found in the existing art.

Additionally, a parallel plate capacitive RH sensor device designed according to the following disclosure makes the output capacitance significantly higher than devices with interdigitated electrodes, grid electrodes, etc. by providing more surface area for capacitance and acts to simplify the fabrication process compared thereto.

In addition to the use of a water absorptive dielectric, the capacitive RH sensor according to one embodiment of the present disclosure uses a conductive material having water or water-vapor permeable properties to form at least a first top electrode conductor plate. Examples of such materials include, but are not limited to, poly(3,4-ethylenedioxythiophene) polystyrene sulfonate (PEDOT:PSS), polyaniline, etc. In some embodiments a second bottom electrode is formed from a solid conductive material (e.g., metal, aluminum, foil, conductive polymer, etc.), while in other embodiments the second bottom electrode is formed from a water or water-vapor permeable conductive material, as described above. As a result of water transmission through the permeable top-electrode material (e.g. PEDOT:PSS), the top electrode does not need to be engineered to be a porous or open structure (e.g., grids, interdigitated), thus increasing the sensor's capacitance and sensitivity while decreasing manufacturing complexity. Furthermore, the compatibility of the water/water-vapor permeable materials with digital printing processes (e.g. inkjet printing, aerosol printing, etc.) enables the digital design and fabrication of RH sensors, which allows for rapid prototyping and design flexibility.

Figure 1:
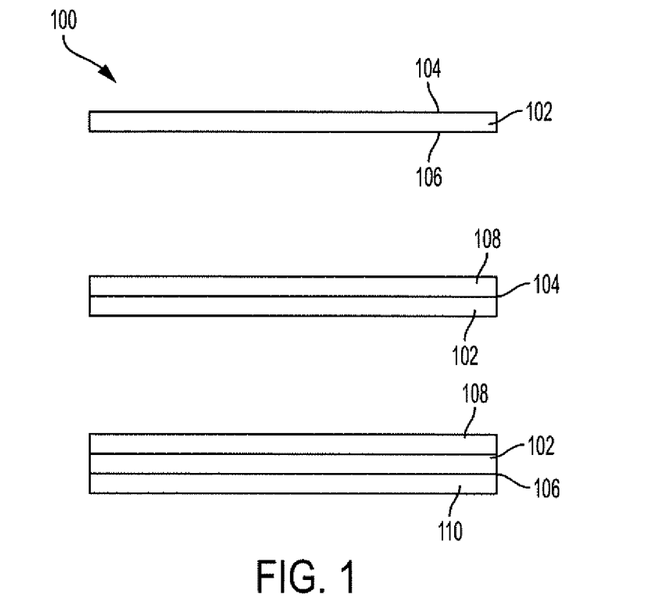
FIG. 1 illustrate a process flow for the manufacture of a RH sensor according to the present disclosure.

FIG. 1 depicts a process flow 100 for constructing an RH sensor according to the present disclosure. Process flow 100 employs printing and/or deposition operations such as inkjet printing, aerosol printing, screen printing, flexographic printing, slot-die coating, and spray coating among others. Initially a water absorptive dielectric substrate layer 102 having at least a first surface 104 and a second surface 106 is subjected to pre-treatment operations. The material of the water absorptive dielectric layer 102 may be, but is not limited to, a polyimide. The pre-treatment operations may be, but are not limited to, UV-ozone treatment, plasma treatment, chemical etching, and combinations of these processes. Commonly it is understood the water is in the form of moisture, vapor, etc.

Figure 3:
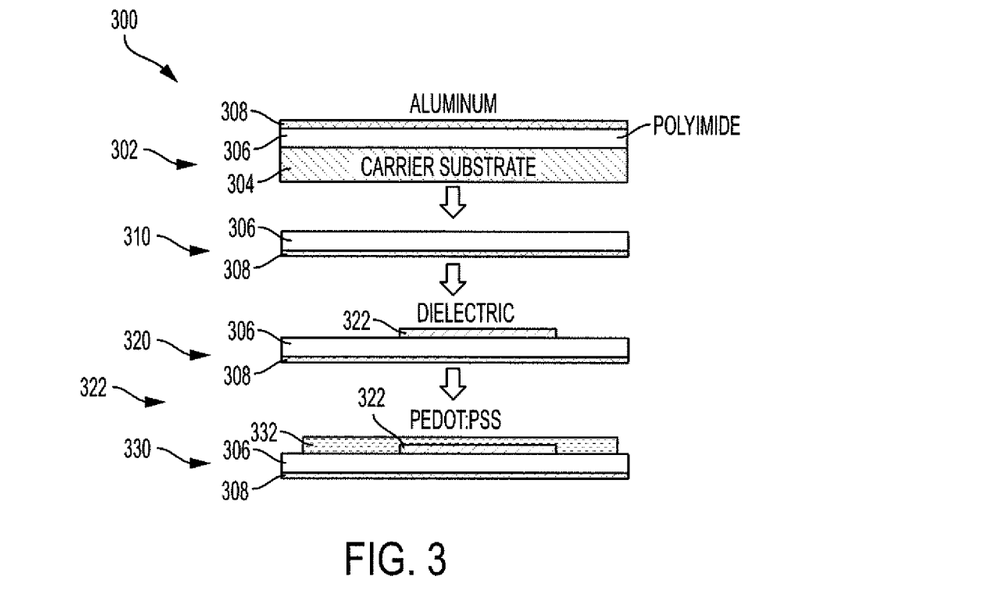
FIG. 3 illustrates a process flow for the manufacture of a RH sensor according to the present disclosure.

The water absorptive dielectric layer 102 can optionally be printed or coated on a supporting substrate (as shown in FIG. 3) to provide mechanical support during the manufacturing process. For example, such a supporting substrate may be useful when the water absorptive dielectric layer 102 is very thin, e.g., approximately 20 microns or thinner. Although, of course, such a support substrate can also be used with thicker water absorptive dielectrics.

An electrode layer 108 is then deposited on the first surface 104 of the water absorptive dielectric layer 102. Thereafter in a next processing step another electrode layer 110 is deposited on the second surface 106 of the water absorptive dielectric layer 102. The deposition steps can be a printing method (e.g., inkjet, aerosol, screen, gravure, flexographic, etc. printing) or a coating method (e.g., sputtering, slot-die coating, blade coating, spray coating, dip coating, etc. . . . ) or a combination of these methods. In this construction at least one of the electrodes 108, 110 is to be considered a top electrode and is comprised of a water or water-vapor permeable material which may be, but is not limited to, PEDOT:PSS.

When the water permeable material (e.g., PEDOT:PSS) is used for only a single electrode (e.g., the top electrode conductor), the other electrode material may be a metal conductor, aluminum, foil, conductive polymer, etc.

It is understood that the process shown in FIG. 1 set out a certain sequence of steps. It is to be appreciated that the process may of course perform the deposition steps in other orders when appropriate.

Figure 2:
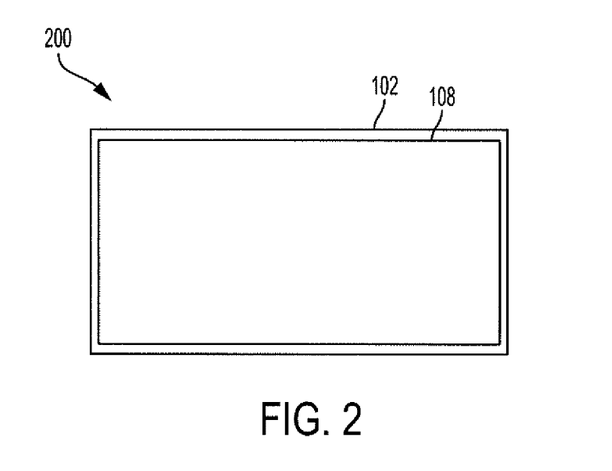
FIG. 2 illustrates a top view of the RH sensor of FIG. 1.

FIG. 2 illustrates a top view of a RH sensor 200, made in accordance with the teachings of FIG. 1. As can be seen in FIG. 2, a top electrode 108 (e.g., 108 of FIG. 1), which is made of a water permeable material (e.g., PEDOT:PSS), is sufficiently sized to cover the water absorptive dielectric 102 (e.g. 102 of FIG. 1; differences in sizes of the layers are shown for convenience of discussion, it is therefore understood that in manufacture the sizes of the layers may vary). The second electrode (e.g., 110 of FIG. 1) is not shown in this view and may be a metal conductor, aluminum, foil, conductive polymer, etc. Alternatively, the second electrode can be another electrode comprised of a water permeable material (e.g., PEDOT:PSS).

The thickness of each of the elements (electrodes, dielectric) are sufficiently thin to allow the overall RH sensor 200 of FIG. 2 to be a flexible, planar RH sensor. For example, in certain embodiments, the dielectric layer can be between 0.5 and 30 microns thick, while the electrode elements can be between 0.05 and 5 microns thick.

RH sensors that employ water permeable electrode(s) 108 and/or 110 made in accordance with the teachings of FIGS. 1 and 2 can achieve at least comparable performance to RH sensors that employ lithographically patterned or screen printed top metal electrodes, as well as other sensors in the art. This comparable performance means that digital design and fabrication of RH sensors can compete with state-of-the-art non-digital manufacturing, thus decreasing the time to market and customization of products incorporating RH sensors.

Thus, the forgoing discloses the use of a water-permeable conductor (e.g., PEDOT:PSS) which is printed or otherwise coated to act as a capacitive humidity sensor in conjunction with a water absorptive dielectric material (e.g., polyimide) to enable low-cost and digital fabrication of fast-responding and stable humidity (RH) sensors using printing technology.

FIG. 3 illustrates another RH (humidity) sensor process flow 300, where the RH sensor is manufactured on thin flexible substrates by printing (e.g., inkjet, aerosol, screen, gravure, flexographic, etc. printing) and/or coating operations (e.g., sputtering, slot-die coating, blade coating, spray coating, dip coating, etc.). As shown in step 302, a carrier or support substrate 304 has a water absorptive dielectric (e.g., polyimide) 306 printed or coated thereon, which in turn has an electrode (e.g., aluminum or other appropriate conductive material) 308 deposited on its surface. Next, in step 310 the carrier substrate 304 is peeled or otherwise removed, and the remaining structure is shown in an inverted position. At this point, in step 320, an optional operation prints a non-water absorptive dielectric 322, on a portion of the water absorptive dielectric 306.

Thereafter, in step 330, the absorptive dielectric substrate 306 is optionally pre-treated and a conductive water-permeable top electrode, (e.g., PEDOT:PSS) 332, is printed or coated over the non-water absorptive dielectric 322 and at least portions of the water absorptive dielectric 306 (e.g., polyimide). The pre-treatment operations may be, but are not limited to, UV-ozone treatment, plasma treatment, chemical etching, and combinations of these processes.

With regard to the optionally provided non-water absorptive dielectric 322, in some instances this structure may be useful to separate portions of the water permeable electrode layer and the water absorptive dielectric material. For example, this arrangement can be used to limit parasitic capacitance from the sensor leads. It is to be appreciated that this optional arrangement may also be used in the structure of FIGS. 1, 2, 5, and 6.

Figure 4:
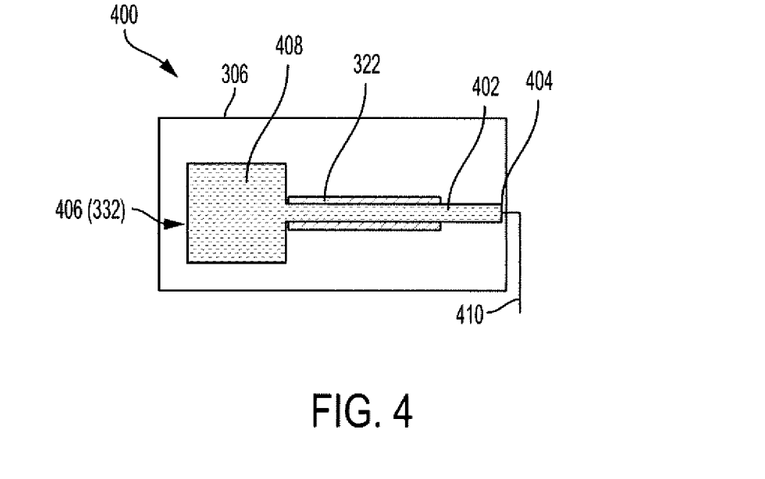
FIG. 4 illustrates a top view of the RH sensor according to FIG. 3.

FIG. 4 illustrates a top view of a RH sensor 400 prepared with the process flow of FIG. 3, including a water absorptive dielectric 306 (see also 306 of FIG. 3), and an electrode (not shown in this view, e.g., see electrode 308 of FIG. 3). As can be seen in FIG. 4, water permeable electrode 406 (e.g., top electrode 332 of FIG. 3) is designed where the water permeable material is formed with a narrower area 402 that has one end that extends to an edge 404, and another end that leads to a square portion 408. This design, with the optional dielectric layer 322 (e.g., also shown in FIG. 3), acts to concentrate capacitive operation at the square portion 408 of the RH sensor 400 (i.e., in this case, the square portion may be considered a water permeable electrode head). It is also understood the non-water absorptive dielectric layer 322 is optionally printed to prevent capacitive sensing from a conductive trace 410 leading to the RH sensor 400.

Figure 5:
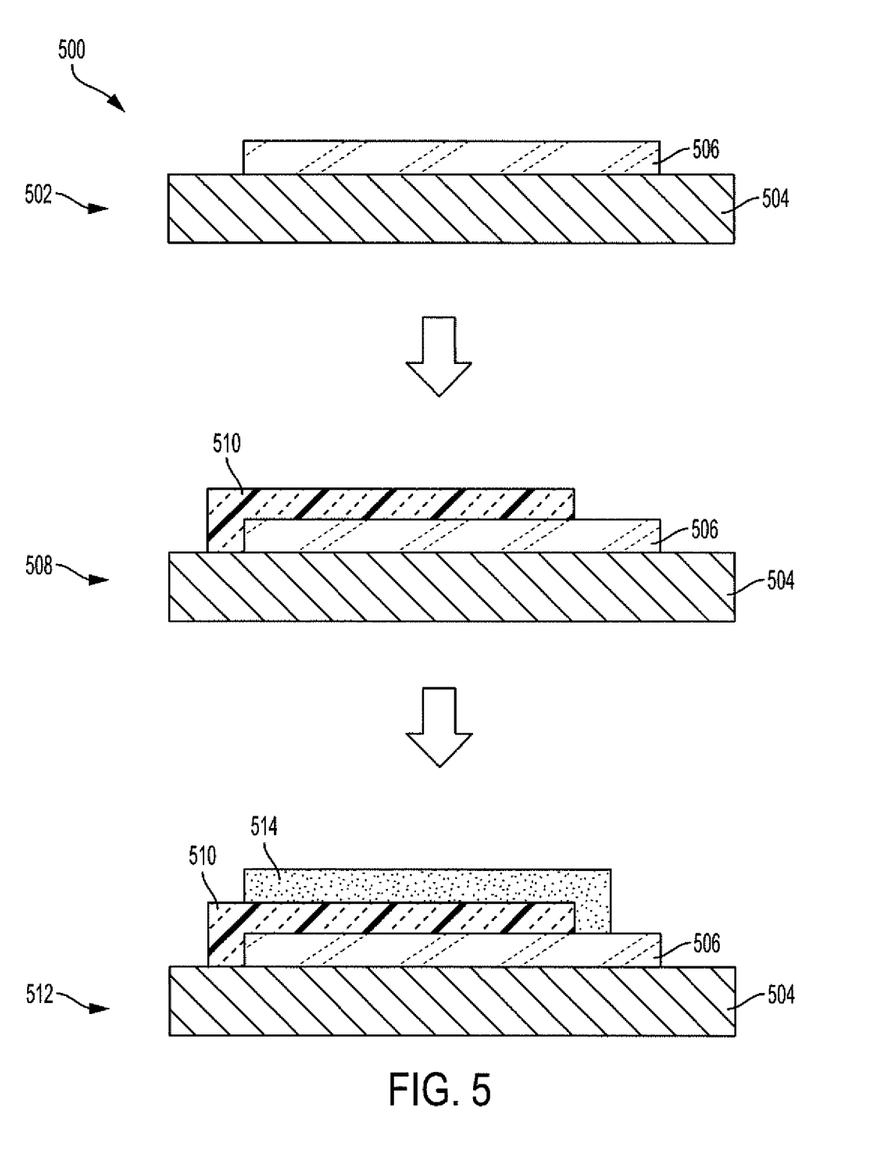
FIG. 5 illustrates a process flow for the manufacture of a RH sensor according to the present disclosure.

FIG. 5 illustrates another RH (humidity) sensor process flow 500, where the RH sensor is manufactured on thin flexible substrates by printing (e.g. inkjet, aerosol, screen, gravure, flexographic, etc. printing) and/or coating operations (e.g. sputtering, slot-die coating, blade coating, spray coating, dip coating, etc.). As shown in step 502, a substrate 504 has a first or bottom conductive electrode 506 printed or coated thereon. Next, in step 508 a water absorptive dielectric (e.g., polyimide) 510 is printed or coated thereon (e.g., on at least a portion of first conductive electrode 506, and extending over an edge thereof), and the dielectric 510 is optionally pre-treated. The pre-treatment operations may be, but are not limited to, UV-ozone treatment, plasma treatment, chemical etching, and combinations of these processes. Finally, in step 512 a conductive water-permeable electrode material (e.g., PEDOT:PSS) is printed or coated over at least portions of the water absorptive dielectric 510 (e.g., polyimide) to yield top electrode 514. It is to be understood that the extending portion of top electrode 514, while appearing to contact a surface of first or bottom conductive electrode 506 is actually behind this layer. This arrangement is more clearly shown in FIG. 6.

Figure 6:
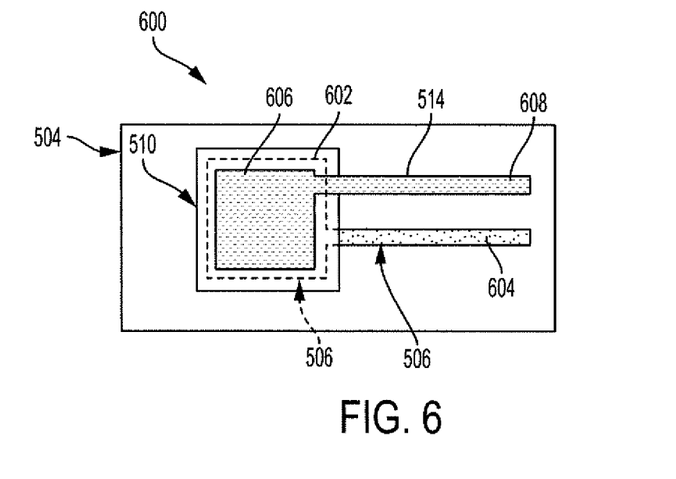
FIG. 6 illustrates a top view of the RH sensor according to FIG. 5.

FIG. 6 illustrates a top view of a RH sensor 600 prepared with the process flow of FIG. 5. As can be seen in FIG. 6, the first or bottom electrode 506 consists of a pad 602 that is completely covered by water absorptive dielectric 510 and a contact lead 604 that extends away from the sensor active area. The water-permeable top-electrode 514 consists of a pad 606 that can be larger or smaller than the bottom electrode pad 602 along with a contact lead 608 that extends away from the sensor active area. It is noted that while not shown, individual conductive traces (such as the one 410 of FIG. 4) can be provided to separately connect to contact lead 604 and contact lead 608.

The dielectric constant of the polyimide changes with humidity since the dielectric is hygroscopic, thus changing the capacitance measured between the first and second electrodes. In alternate embodiments, the water absorptive dielectric can change thickness instead of or in addition to changing dielectric constant as water is adsorbed. Such a dielectric would also exhibit a capacitance that is a function of RH.

In the present disclosure therefore, the electrode plates are easily/commercially printable or coatable (e.g., inkjet printing, aerosol printing, screen printing, gravure printing, flexographic printing, sputtering, slot-die coating, blade coating, spray coating, dip coating, etc.). For example, the top electrode for such a structure may be the PEDOT:PSS formed by inkjet printing or aerosol printing methods. In certain embodiments, the bottom electrode may be a printed solid metal (or other appropriate conductive material) or alternatively, could also be a printed water permeable material such as, but not limited to, PEDOT:PSS. Printed hygroscopic moisture-sensitive dielectrics (e.g., water absorptive material) are thus used herein in one embodiment in conjunction with a PEDOT:PSS conductive electrode. Alternative electrode structures include 1) printing PEDOT:PSS on both sides of the substrate instead of using other conductive material (e.g., metals, aluminum, conductive polymers, etc.) and 2) metal grid lines deposited on the PEDOT:PSS in order to minimize resistivity.

A particular aspect of the foregoing concepts disclosed herein is that a water permeable top electrode can completely cover the top of the RH sensor device, allowing the RH sensor device to have a significant and larger capacitive area resulting in higher capacitance and sensitivity of the structure, but still allowing the structure to be manufactured by digital manufacturing techniques such as inkjet and/or aerosol printing, along with other printing and coating processes. Furthermore, the high conductivity of PEDOT:PSS and similar materials allows the top electrode layer to be thinner than screen-printed carbon layers for a target resistance and RC time constant, thus enabling sensors with faster response times.

Further, in embodiments herein, the water absorptive dielectric (e.g., in certain examples a polyimide) is treated prior to printing or coating of the water or water-vapor permeable top electrode (e.g., PEDOT:PSS). The treatment of the water absorptive dielectric is, (e.g., by UV ozone treatment) to improve wetting of the water absorptive material (e.g., polyimide) for connection to the water permeable material (e.g., PEDOT:PSS). This operation will, in certain embodiments, also improve the response time of the fully manufactured device, such as by controlling the extent and rate of water uptake by the water absorptive dielectric. Additionally, plasma and chemical treatments of the water absorptive dielectric (e.g., polyimide) can also be used to treat the water absorptive dielectric (e.g., polyimide) prior to printing of the water permeable electrode structure.

Figure 7:
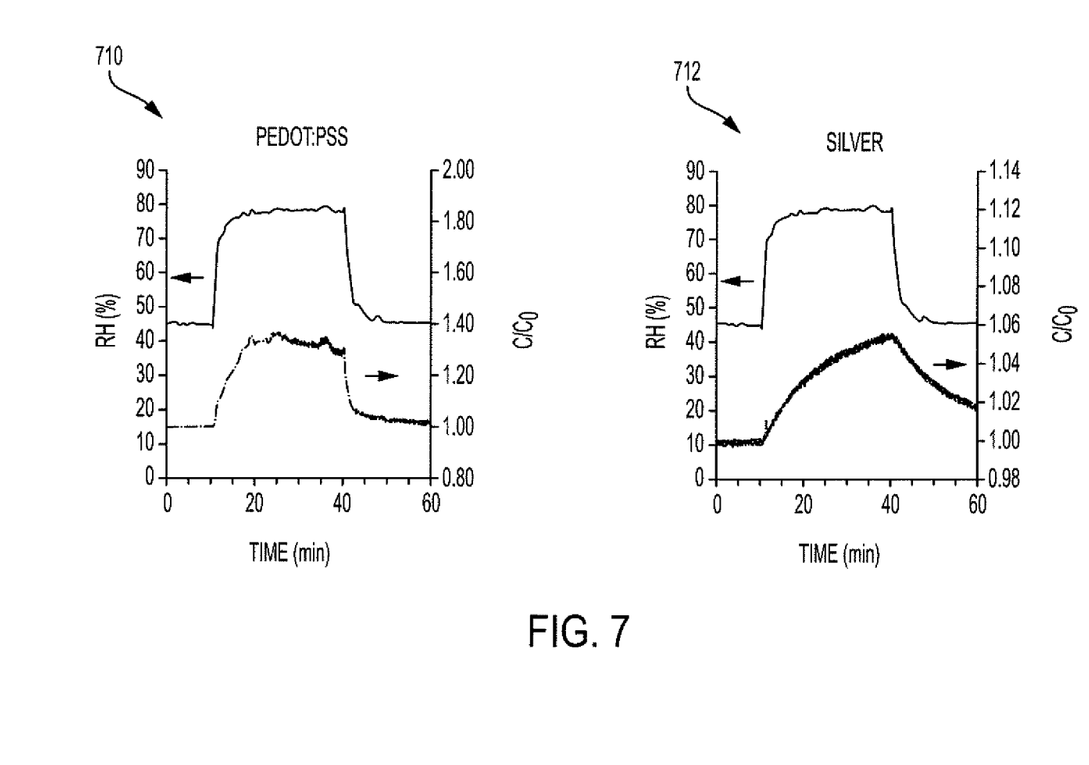
FIG. 7 depicts two graphs for response times for two distinct RH sensors.

FIG. 7 depicts graphs 710 and 712, which show the response time of two RH sensors. RH sensor 710 was manufactured in accordance with the process flows corresponding to FIGS. 1-6 and including a UV ozone pre-treatment of a polyimide material. As shown, sensor 710 has a significantly faster response time than an RH sensor (see: graph 712) which does not employ the present teaching (i.e., it uses a patterned silver grid top electrode with open gaps and electrode widths of 100 μm) and which did not include a pre-treatment of the dielectric.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of forming a capacitive relative humidity sensor comprising:
   optionally pre-treating a water absorptive dielectric layer;
   depositing a first electrode on at least a portion of a surface of the water absorptive dielectric layer; and
   depositing a second electrode on at least a portion of another surface of the water absorptive dielectric layer, wherein at least one of the first electrode and the second electrode is comprised of a water permeable material;
   wherein a geometric dimension of the water absorptive dielectric layer changes with humidity, said changes of the geometric dimension causing changes in capacitance between the first electrode and the second electrode.

2. The method according to claim 1 further including treating the water absorptive dielectric layer prior to depositing the water permeable electrode, to at least one of (i) increase the wetting of the water absorptive dielectric layer and (ii) control at least one of an extent and rate of water uptake by the water absorptive dielectric layer.

3. The method according to claim 1 further including depositing a non-water absorptive dielectric between at least a portion of one of the surfaces of the water absorptive dielectric and one of the first electrode and the second electrode.

4. The method according to claim 1 further including providing a carrier substrate;
   the water absorptive dielectric layer being deposited on a surface of the carrier substrate; and
   separating the water absorptive dielectric layer from the carrier substrate.

5. A method of forming a capacitive relative humidity sensor comprising:
   depositing a first electrode on at least a portion of a substrate;
   depositing a water absorptive dielectric layer on at least a portion of the first electrode;
   optionally pre-treating the water absorptive dielectric layer; and
   depositing a second electrode on at least a portion of the water absorptive dielectric layer, wherein the second electrode layer is made of a water permeable material;
   wherein a geometric dimension of the water absorptive dielectric layer changes with humidity, said changes in the geometric dimension causing changes in capacitance between the first electrode and the second electrode.

6. The method according to claim 5 wherein one of the deposition methods is one of inkjet printing and aerosol printing.

7. The method according to claim 5 wherein the water permeable material is a PEDOT:PSS material.

8. The method according to claim 5 wherein a dielectric constant of the water absorptive dielectric layer changes with humidity, causing changes in capacitance between the first electrode and the second electrode.

9. A capacitive relative humidity sensor, comprising:
   a water absorptive dielectric layer having a first surface and a second surface;
   a first electrode positioned in contact with at least a portion of the first surface of the water absorptive dielectric layer; and
   a second water-permeable electrode positioned in contact with at least a portion of the second surface of the of the water absorptive dielectric layer;
   wherein a geometric dimension of the water absorptive dielectric layer changes in response to humidity, said changes in the geometric dimension causing changes in capacitance between the first electrode and the second electrode.

10. The capacitive relative humidity sensor according to claim 9 wherein the first electrode is a non-water permeable material.

11. The capacitive relative humidity sensor according to claim 9 wherein the first electrode is a water permeable material.

12. The capacitive relative humidity sensor according to claim 11 wherein the water permeable material is a PEDOT:PSS material.

13. The capacitive relative humidity sensor according to claim 9 wherein the second electrode is deposited across an entire surface of the water absorptive dielectric layer.

14. The capacitive relative humidity sensor according to claim 9 wherein the deposition of the first and/or second electrodes is by one of inkjet printing and aerosol printing.

15. The capacitive relative humidity sensor according to claim 9 wherein the water permeable material is a PEDOT:PSS material.

16. The capacitive relative humidity sensor according to claim 9 further including treating the water absorptive dielectric prior to depositing the water permeable electrode, to increase the wetting of the water absorptive dielectric and/or to control the extent and rate of water uptake by the water absorptive dielectric layer.

17. The capacitive relative humidity sensor according to claim 9 further including a non-water absorptive dielectric between at least a portion of one of the surfaces of the water absorptive dielectric and one of the first electrode and the second electrode.

18. A capacitive relative humidity sensor, comprising:
   a water absorptive dielectric layer having a first surface and a second surface;
   a first electrode positioned in contact with at least a portion of the first surface of the water absorptive dielectric layer;
   a second electrode positioned in contact with at least a portion of the second surface of the of the water absorptive dielectric layer; and
   a non-water absorptive dielectric positioned between at least a portion of one of the first and second surfaces of the water absorptive dielectric and one of the first and second electrodes;
   wherein at least one of the first and second electrodes is water-permeable; and
   wherein, in response to humidity, the water absorptive dielectric layer exhibits at least one of (i) changes in at least one of its geometric dimensions and (ii) changes in its relative permittivity, said changes causing changes in capacitance between the first electrode and the second electrode.

19. The sensor according to claim 18, wherein the water absorptive dielectric layer has been treated by at least one of UV-ozone treatment and chemical etching to at least one of (i) increase the wetting of the water absorptive dielectric layer and (ii) control at least one of an extent and rate of water uptake by the water absorptive dielectric layer.

* * * * *